United States Patent
Gehrmann et al.

(10) Patent No.: US 9,705,856 B2
(45) Date of Patent: Jul. 11, 2017

(54) SECURE SESSION FOR A GROUP OF NETWORK NODES

(75) Inventors: Christian Gehrmann, Lund (SE);
Oscar Ohlsson, Huddinge (SE);
Ludwig Seitz, Lund (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/413,276

(22) PCT Filed: Jul. 27, 2012

(86) PCT No.: PCT/SE2012/050850
§ 371 (c)(1),
(2), (4) Date: Jan. 7, 2015

(87) PCT Pub. No.: WO2014/017959
PCT Pub. Date: Jan. 30, 2014

(65) Prior Publication Data
US 2015/0195261 A1   Jul. 9, 2015

(51) Int. Cl.
*H04L 29/06* (2006.01)
*H04L 9/08* (2006.01)
(Continued)

(52) U.S. Cl.
CPC .......... *H04L 63/062* (2013.01); *H04L 9/0833* (2013.01); *H04L 9/3263* (2013.01);
(Continued)

(58) Field of Classification Search
CPC . H04L 63/062; H04L 67/141; H04L 63/0823; H04L 9/3263; H04L 9/0833; H04L 12/1822
See application file for complete search history.

(56) References Cited

U.S. PATENT DOCUMENTS

| | | | | |
|---|---|---|---|---|
| 5,745,574 A | * | 4/1998 | Muftic | H04L 9/3268 380/286 |
| 7,853,995 B2 | * | 12/2010 | Chow | H04L 63/0807 713/175 |

(Continued)

FOREIGN PATENT DOCUMENTS

| | | | |
|---|---|---|---|
| WO | WO 2009133419 A1 * | 11/2009 | ......... H04L 63/0823 |
| WO | WO 2011/141040 | 11/2011 | |

OTHER PUBLICATIONS

Chen et al., Group Key Agreement Scheme for Mobile Ad Hoc Networks Based on Threshold Secret Sharing, Aug. 2010, Third International Symposium on Electronic Commerce and Security, pp. 176-180.*

(Continued)

*Primary Examiner* — Kenneth Chang
(74) *Attorney, Agent, or Firm* — Patents on Demand P.A.; Brian K. Buchheit; Scott M. Garrett (57) ABSTRACT

Methods (500) of a network node (111) for creating and joining secure sessions for members (111-114) of a group of network nodes are provided. The methods comprise receiving an identity certificate and an assertion for the network node as well as a secret group key for the group. The method for creating a session further comprises creating (501) a session identifier and a secret session key for the session, and sending (502) an encrypted and authenticated broadcast message comprising the session identifier. The method for joining a session further comprises sending an encrypted and authenticated discovery message comprising the identity certificate and the assertion, and receiving an encrypted and authenticated discovery response message from another network node which is a member of the group. The disclosed combined symmetric key and public key scheme is based on the availability of three credentials at each node, i.e., the identity certificate, the assertion, and the secret group key, (Continued)

which are received from a trusted entity. Further, a computer program, a computer program product, and a network node are provided.

21 Claims, 4 Drawing Sheets

(51) Int. Cl.
    *H04L 12/18* (2006.01)
    *H04L 9/32* (2006.01)
    *H04L 29/08* (2006.01)
(52) U.S. Cl.
    CPC ........ *H04L 12/1822* (2013.01); *H04L 63/065* (2013.01); *H04L 63/0823* (2013.01); *H04L 67/141* (2013.01); *H04L 2463/062* (2013.01)

(56) References Cited

U.S. PATENT DOCUMENTS

| | | | |
|---|---|---|---|
| 8,112,066 B2* | 2/2012 | Ben Ayed | G06Q 20/108 455/41.1 |
| 8,495,375 B2* | 7/2013 | Sherkin | H04L 9/3066 380/283 |
| 2001/0034841 A1* | 10/2001 | Shambroom | G06F 21/41 726/10 |
| 2002/0157002 A1* | 10/2002 | Messerges | G06F 21/10 713/155 |
| 2003/0056114 A1* | 3/2003 | Goland | H04L 63/04 726/5 |
| 2005/0220304 A1* | 10/2005 | Lenoir | G06F 21/445 380/255 |
| 2006/0168446 A1* | 7/2006 | Ahonen | H04L 9/0822 713/163 |
| 2006/0177067 A1* | 8/2006 | Kim | H04L 9/0822 380/278 |
| 2007/0011233 A1 | 1/2007 | Manion et al. | |
| 2007/0140483 A1 | 6/2007 | Jin et al. | |
| 2008/0046987 A1* | 2/2008 | Spector | G06F 21/604 726/6 |
| 2008/0130902 A1 | 6/2008 | Foo Kune et al. | |
| 2008/0282081 A1* | 11/2008 | Patiejunas | H04L 9/3273 713/153 |
| 2009/0150668 A1* | 6/2009 | Liu | H04L 9/0891 713/163 |
| 2009/0254392 A1* | 10/2009 | Zander | G06F 21/6218 705/50 |
| 2009/0254971 A1* | 10/2009 | Herz | G06Q 10/10 726/1 |
| 2011/0202755 A1* | 8/2011 | Orsini | H04L 63/029 713/151 |
| 2011/0219067 A1* | 9/2011 | Bernosky | H04L 29/12066 709/203 |
| 2012/0045064 A1* | 2/2012 | Rembarz | H04L 9/0822 380/281 |

OTHER PUBLICATIONS

PCT Written Opinion of the International Searching Authority for International application No. PCT/SE2012/050850, Apr. 19, 2013.
International Search Report for International application No. PCT/SE2012/050850, Apr. 19, 2013.
"A Complete Anonymous Group Key Agreement Protocol" by Yao et al.; 2010 Second International Conference on Networks Security, Wireless Communications and Trusted Computing, 2010.
"Security Improvements to Anonymous ID-based Group Key Agreement for Wireless Networks" by Chee et al.; 2010 Seventh International Conference on Information Technology, 2010.

* cited by examiner

SECURE SESSION FOR A GROUP OF NETWORK NODES

PRIORITY

This nonprovisional application is a U.S. National Stage Filing under 35 U.S.C. §371 of International Patent Application Serial No. PCT/SE2012/050850 filed Jul. 27, 2012 and entitled "Secure Session For A Group Of Network Nodes."

TECHNICAL FIELD

The invention relates to methods for creating and joining a secure session for members of a group of network nodes. The invention relates also to corresponding network nodes, computer programs, and computer program products.

BACKGROUND

The invention addresses security needs which arise when a group of network nodes communicates which each other by creating and/or joining a secure session for members of the group. The group of network nodes may, e.g., be a plurality of mobile phone users, communicating by means of a local or remote communication technology, and belonging to the same social network group who wish to share information with each other without letting anyone outside the group have access to their information or even know the real identities behind the users or the group. The group of network nodes may also be a law enforcement group, e.g., policemen, coordinating a mission, aid workers, or a collection of Machine-to-Machine (M2M) devices.

In such cases, there is a need for mechanisms that allow users to securely join, by authentication, a network group and to exchange information in this group such that any outsider, i.e., non-group member, neither can join a secure session nor eavesdrop the communication between group members, or even gain knowledge of the real identities of the group members or the group.

Many authentication and key exchange schemes rely on the presence of a trusted third party, such as a Key Distribution Centre (KDC), the Kerberos system being one example. Different from this approach, the Internet Engineering Task Force (IETF) Group Key Management Protocol (GKMP) entrusts the key distribution to the communicating entities themselves. In GKMP, one of the group members acts as controller node and uses an asymmetric encryption algorithm, which assumes the possession of a certificate of each group member, to distribute to each member in a communication session a symmetric key which is unique for each group member and which is shared between the controller node and each member in the group. In addition, the controller generates a shared session group key that is used to protect the communication between the participants of the session. Re-keying, when members are added and removed from the group, is then performed by the controller with the help of the shared symmetric keys and/or the session group key.

In GKMP, and many other similar or related schemes, the identity of nodes joining the communication session is revealed to an eavesdropping outsider, as the latter may assume that certificates certifying a node's identity as well as group membership are distributed among the members and are used to identify other group members. This is also the case for the widely used secure Peer-to-Peer (P2P) or client-server authentication and key establishment protocols, such as Transport Layer Security (TLS) and Internet Key Exchange (IKE). For instance, in the case of TLS at least the identity of one of the participating entities is revealed, and IKE in identity protection mode is sensitive to active attackers.

In order to overcome shortcomings with respect to identity privacy in authentication schemes, it has been proposed to not reveal the identity of a node in authentication and key exchange steps to an adversary, i.e., outsider, which can intercept messages sent on a public channel. Instead, the authentication and key exchange messages are protected using public keys of the participating peers. However, in order for the scheme to work, the public keys must be known prior to authentication taking place.

In order to provide privacy preserving authentication and key exchange, several schemes referred to as "secret handshakes" have been proposed. These schemes apply a much more strict security model which has the benefit that it should not only be impossible to impersonate users but it should also not be possible for an outsider who observes a secret handshake to identify who is involved in the handshake, or the group or groups the participating nodes belong to. Neither should it be possible to link several different observed handshakes to particular users or groups of users.

Secret handshake protocols are typically based on bilinear maps which can be constructed using Tate or Weil pairings on elliptic curves and which allow two parties belonging to the same secret group to calculate a shared secret in three protocol interactions. In later additions to the protocols, the feature of unlinkability has been added, thereby allowing credentials to be used for multiple sessions. Further, the issue of revocation of credentials without compromising the security expectations of a secret handshake protocol has been solved.

These schemes, which are based on bilinear maps, require efficient algorithms and implementations for computing either the Weil or the Tate pairing in order to make their application to cryptography feasible, and the time required for computing cryptographically secure bilinear pairings has been reduced from several minutes to only a few milliseconds during the past years.

However, despite some fundamental breakthroughs both with respect to secret handshake design and their implementations, such schemes are still too complex. Further, the schemes have not been under cryptanalysis for enough long time in order to be trustworthy for commercial usage. Therefore, there is a need for complementary schemes to solve the secret authentication problem in groups, relying on well proven and widely used cryptographic principles.

SUMMARY

It is an object of the present invention to provide an improved alternative to the above techniques and prior art.

More specifically, it is an object of the present invention to provide an improved handling of secure sessions for members of a group of network nodes. A network node may be any type of communication terminal, e.g., a mobile phone, a User Equipment (UE), a personal computer, a tablet computer, a Machine-to-Machine (M2M) device, or the like. The group of network nodes, or their respective users, may, e.g., be a social network group, a group of law enforcement personnel coordinating a mission, or a group of aid workers in a dangerous region.

These and other objects of the invention are achieved by means of different aspects of the invention, as defined by the independent claims. Embodiments of the invention are characterized by the dependent claims.

According to a first aspect of the invention, a method of a network node is provided, in particular a method for creating a secure session for members of a group of network nodes. The method comprises receiving an identity certificate for the network node, an assertion for the network node, and a secret group key for the group. The assertion certifies a role of the network node within the group. The identity certificate, the assertion, and the secret group key, are received from a trusted entity. The method further comprises creating a session identifier and a secret session key for the secure session, and sending a broadcast message comprising the session identifier. The broadcast message is encrypted and authenticated using the group key.

According to a second aspect of the invention, another method of a network node is provided, in particular a method for joining a secure session for members of group of network nodes. The method comprises receiving an identity certificate for the network node, an assertion for the network node, and a secret group key for the group. The assertion certifies a role of the network node within the group. The identity certificate, the assertion, and the secret group key, are received from a trusted entity. The method further comprises sending a discovery message comprising the identity certificate for the network node and the assertion for the network node. Optionally, the discovery message may further comprise a session identifier. The discovery message is encrypted and authenticated using the group key. The method further comprises receiving a discovery response message from another network node, which other network node is a member of the group. The discovery response message comprises a secret session key for the secure session. The discovery response message is encrypted and authenticated using the public key of the identity certificate of the network node. The signature together with the identity certificate and the assertion comprised in the discovery response message may be used to check whether the discovery response message originated from a member of the group.

According to a third aspect of the invention, a computer program is provided. The computer program comprises computer program code. The computer program code is adapted, if executed on a processor, to implement the method according to an embodiment of the first or the second aspect of the invention.

According to a fourth aspect of the invention, a computer program product is provided. The computer program product comprises a computer readable storage medium. The computer readable storage medium has the computer program according to the third aspect of the invention embodied therein.

According to a fifth aspect of the invention, a network node is provided. The network node comprises a receiver, a processor, and a transmitter. The receiver is arranged for receiving an identity certificate for the network node, an assertion for the network node, and a secret group key for the group. The assertion certifies a role of the network node within a group of network nodes. The identity certificate, the assertion, and secret group key are received from a trusted entity. In response to a request to create a secure session for members of the group, the processor is arranged for creating a session identifier and a secret session key for the secure session. The request to create a secure session may, e.g., be received from a user of the network node. The transmitter is arranged for, in response to the request to create a secure session, sending a broadcast message comprising the session identifier. The broadcast message is encrypted and authenticated using the group key. The transmitter is further arranged for, in response to a request to join an existing secure session for members of the group, sending a discovery message comprising the identity certificate for the network node and the assertion for the network node. Optionally, the discovery message may further comprise a session identifier. The discovery message is encrypted and authenticated using the group key. The request to join an existing session may, e.g., be received from a user of the network node. The receiver is further arranged for, in response to the request to join an existing secure session, receiving a discovery response message from another network node, which other network node is a member of the group. The discovery response message comprises a secret session key for the secure session and is encrypted and authenticated using the public key of the identity certificate of the network node. The signature together with the identity certificate and the assertion comprised in the discovery response message may be used to check whether the discovery response message originated from a member of the group.

The present invention makes use of an understanding that an improved handling, in particular creating and joining, of secure sessions for members of a group of network nodes may be achieved by a combined symmetric key and public key scheme. The proposed scheme is based on the availability of three credentials at each node, i.e., an identity certificate, an assertion, and a secret group key. These credentials are received from a trusted entity, preferably over an authenticated, integrity and confidentiality protected, secure channel. The trusted entity typically belongs to some central authority and has a supervising role. It may, e.g., issue identity certificates, assertions, and group keys, create new groups, and assist in finding other network nodes. As an alternative, the credentials may be received from another, trusted, network node.

The identity certificate is unique for each network node and comprises a public key, used for encryption and authentication, and a corresponding private key. The assertion certifies that the network node belongs to a certain group and which role the network node has within the group, e.g., creator, administrator, user, or the like. The symmetric group key is unique for each group and is used for encrypting and authenticating messages transmitted by members of the group. In this way, only network nodes receiving such messages which are members of the group can decrypt the message.

The proposed scheme allows secretly identifying and exchanging keys with other members of the same group without revealing the group or individual identities of group members. As compared to known solutions the proposed scheme is less complex. In addition to that it supports revocation of users.

According to an embodiment of the invention, the method further comprises receiving a discovery message from a further network node. The discovery message comprises an identity certificate of the further network node and an assertion of the further network node. Optionally, the discovery message may further comprise a session identifier or an invitation to join an existing session. The discovery message is encrypted and authenticated using the group key. The method further comprises determining whether the further network node is on a revocation list and determining whether the assertion of the further network node is valid. The revocation list is provided by the trusted entity. The method further comprises, under the condition that the further network node is not on the revocation list and that the assertion of the further network node is valid, sending a discovery response message to the further network node. The discovery response message comprises the secret session key and is encrypted and authenticated using the public key of the identity certificate of the further network node.

According to an embodiment of the invention, the discovery message further comprises a session identifier, and the secret session key comprised in the discovery response message corresponds to the session identifier.

According to an embodiment of the invention, the identity certificate is unique for each network node and comprises a public key and a corresponding private key. The identity certificate may be used for both encryption and signature generation. However, one could envisage an embodiment of the invention utilizing separate certificates for encryption and signing, respectively.

According to an embodiment of the invention, the assertion is unique for each network node and certifies that the network node is a member of the group and the role of the network node within the group, such as creator, administrator, user, or the like.

According to an embodiment of the invention, the group key is unique for each group of network nodes and is symmetric. However, the invention is not limited to symmetric keys and embodiments of the invention utilizing non-symmetric keys may be envisaged.

According to an embodiment of the invention, the identity certificate is received from the trusted entity during a registration phase.

According to an embodiment of the invention, the group key and the assertion are received from the trusted entity during a group creation or a group join phase.

According to an embodiment of the invention, the group key and the assertion are received from an authorized member of the group during a group creation or a group join phase. To this end, the responsibility for providing these credentials to members of the group may be delegated from the trusted third party to one of the members, e.g., the creator of a session or node which has already joined the session.

Even though advantages of the invention have in some cases been described with reference to embodiments of the methods according to the first and the second aspect of the invention, corresponding reasoning applies to embodiments of the computer program according to the third aspect of the invention, the computer program product according to the fourth aspect of the invention, as well as the network node according to the fifth aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

In the following, embodiments of the invention will be described with reference to FIGS. 1 to 7.

Figure 1:
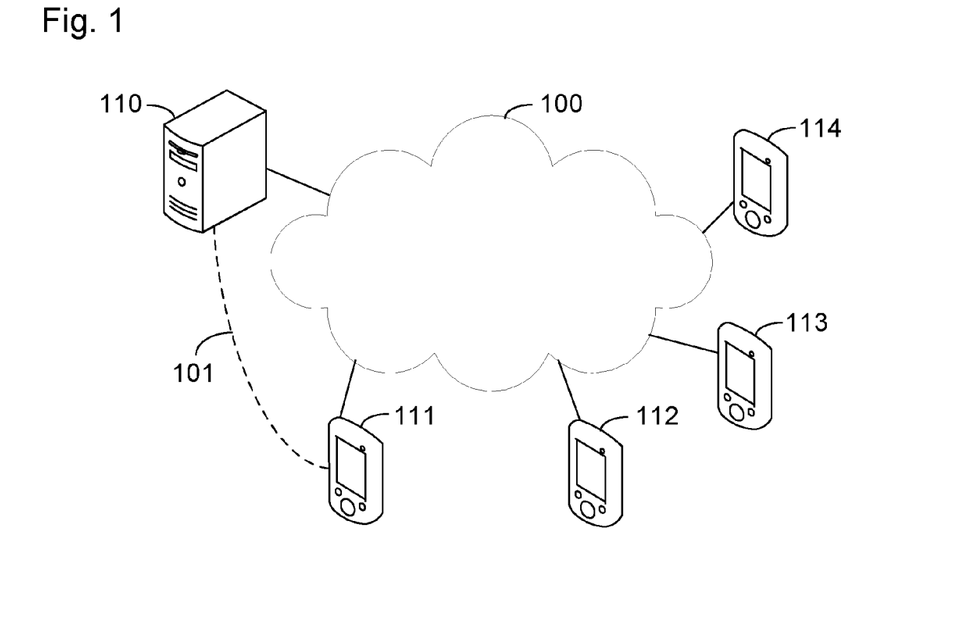
FIG. 1 shows a group of users and the trusted entity, in accordance with an embodiment of the invention.

The proposed solution is based on two different types of entities, one or more users 111-114 (denoted Alice, Bob, Charlie, and David, respectively) and a trusted entity 110, as illustrated in FIG. 1. For instance, users 111-114 may be members of a social network, the services of which they may access by means of communication terminals which are nodes of a communications network 100. In the remainder, the terms user, mobile terminal, and network node, will be used interchangeably, unless stated otherwise. The communication terminals may, e.g., be personal computers, mobile phones, User Equipment (UE), tablet computers, smart phones, or the like. The communications network 100 may, e.g., be any one, or a combination of, the internet, a Local Area Network (LAN), a cellular radio network, a Wireless LAN (WLAN), an ad-hoc wireless network, a mesh network, Bluetooth, ZigBee, or the like. The trusted entity 110 may, e.g., be controlled by a provider of the social network and is responsible for issuing certificates, assertions, group keys, and revocation lists, to its members. The trusted entity 110 is also a node of communications network 100.

The disclosed solution is based on the assumption that each user who is a member of a particular group of network nodes, e.g., a social network group, is in possession of three credential parameters, an identity certificate, and assertion, and a symmetric group key.

The identity certificate is unique for each network node and comprises a public key and a corresponding private key. The certificate may be used for both encryption and signature generation. In the following, the identity certificate for user Alice 111 is denoted $Cert_A$.

The assertion, which may be based on a standard assertion format, such as the Security Assertion Markup Language (SAML), certifies that the user behind a certain identity belongs to a certain group of network nodes and which role the user has within that group. In the following, the assertion for user Alice 111 belonging to group G and having role R within the group is denoted $ASR_A(G, R_A)$.

The symmetric group key is unique for each group of network nodes. In the following, the key for group G is denoted $K_G$.

Corresponding abbreviations are used for Bob 112, Charlie 113, and David 114, i.e., $Cert_B$, $Cert_C$, and $Cert_D$, as well as $ASR_A(G, R_B)$, $ASR_C(G, R_C)$, and $ASR_A(G, R_D)$, respectively.

The proposed solution consists of distinct phases, which are described in the following with reference to sequence diagrams which illustrate embodiments of the invention.

Figure 2:
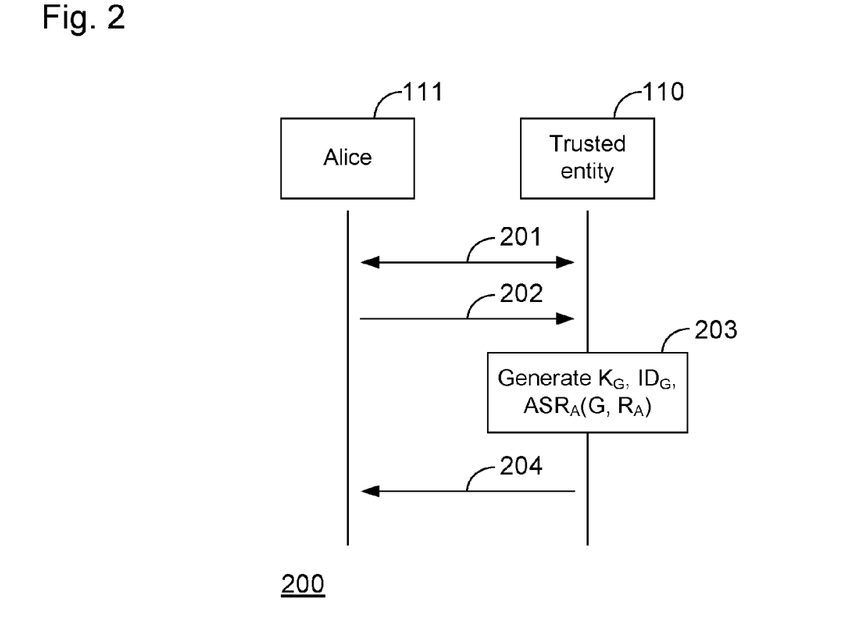
FIG. 2 illustrates a procedure for creating a group of network nodes, in accordance with an embodiment of the invention.

The first phase relates to creating a group of network nodes and is described with reference to FIG. 2, which shows a sequence diagram illustrating an embodiment of method 200 for creating a group of network nodes.

In order to create a group of network nodes, such as a social network group, a user 111-114 is required to register with the trusted entity 110. In the case of a social network, this may amount to becoming a member of the social network by registering with the provider of the social network.

In order to register with the trusted entity 110, Alice 111 and the trusted entity 110 perform a mutual authentication 201 and establish a secure channel 101 between them. For this purpose, the Transport Layer Security (TLS) protocol may, e.g., be used. As part of the mutual authentication 201, Alice 111 and the trusted entity 110 exchange identity certificates. In this way, the trusted entity 110 acquires the identity certificate $Cert_A$ of Alice 111. Note that Alice 111 will not transmit its certificate until a secure channel 101 based on a certificate of the trusted entity 110 is established, in order to avoid leaking the identity of Alice 111 to an adversary which is eavesdropping the registration communication.

In the next step, Alice 111 sends a request 202 for creating a new group G of network nodes, e.g., a social network group, to the trusted entity 110. Optionally, this request may comprise a group name.

Subsequently, in response to the request 202, the trusted entity 110 creates 203 a symmetric secret group key $K_G$, a unique group identity $ID_G$, and an assertion $ASR_A(G, R_A)$ which proves to other members of group G that Alice 111 is the creator of the group and is allowed to join all sessions created within in the group. The assertion comprises, among other parameters, the group identity $ID_G$, the group name (if any), as well as a secure one-way hash of $Cert_A$ and the role of Alice 111, $R_A$. In this case, Alice 111 is marked a creator of group G. This may, e.g., imply that Alice 111 is allowed to invite, delete, and dissolve the group G. The assertion is signed using a private key of the trusted entity 110.

Finally, the trusted entity 110 sends 204 the group key $K_G$ and the group identity $ID_G$ together with the assertion $ASR_A(G, R_A)$ to Alice 111 over the encrypted and integrity protected channel 101.

Figure 3:
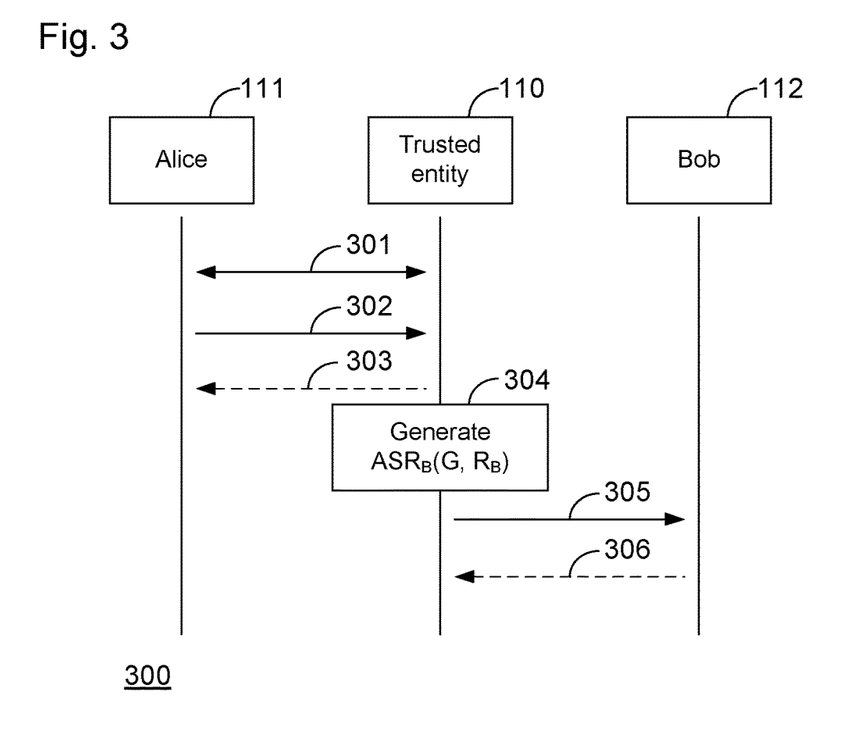
FIG. 3 illustrates a procedure of joining an existing group of network nodes, in accordance with an embodiment of the invention.

Next, it is described how another user 112-114 may join group G which was previously created by Alice 111. This may, e.g., be the case if another user, e.g., Bob 112, is invited to join group G. In FIG. 3, an embodiment of method 300 of inviting Bob 112 by the trusted entity 110 is illustrated.

First, Alice 111, who is the creator of group G, initiates a mutual authentication 301 with the trusted entity 110. As part of the mutual authentication 301, the peers exchange identity certificates.

Then, Alice 111 sends a request 302 to the trusted entity 110 for adding Bob 112 to group G. This may be accomplished in several ways. For instance, Alice 111 may search for Bob 112 in a database provided by the trusted entity and send the identity of Bob 112, or the identity certificate of Bob 112, to the trusted entity 110. Optionally, Alice 111 may assign a role which Bob 112 has within the group. Optionally, the trusted entity 110 may acknowledge 303 the request.

In the next step, the trusted entity generates 304 an assertion $ASR_B(G, R_B)$ for Bob 112, proving that Bob 112 is a member of group G with role $R_B$. Among other parameters, the assertion comprises the group identity $ID_G$ as well as a secure one-way hash of $Cert_B$ and the role $R_B$ of Bob 112. The assertion is signed using the private key of the trusted entity 110. Hence, the assertion can be verified by any other member of group G which is in possession of the public key of the trusted entity 110.

Subsequently, the assertion $ASR_B(G, R_B)$ is sent 305 to Bob 112 either directly, using push based delivery, or via Alice 111 together with the secret group key $K_G$. The assertion and the group key are encrypted using the public key of Bob 112 such that no third party may gain access to the clear text of the assertion or the group key. Optionally, Bob 112 acknowledges 306 the receipt of the assertion $ASR_B(G, R_B)$ and the group key $K_G$.

As an alternative to the embodiment described hereinbefore, an alternative embodiment 400 for Bob 112 joining an existing group G by means of direct invitation by Alice 111 is now described with reference to FIG. 4. In this case, the trusted entity 110 is not involved.

In the case of direct invitation, it is assumed that Alice 111 and Bob 112 are in close proximity to each other such that they can securely exchange messages between each other without revealing any information to an outsider. This may, e.g., be achieved by means of Near Field Communication (NFC) technology which has a range of less than 0.2 meters.

Figure 4:
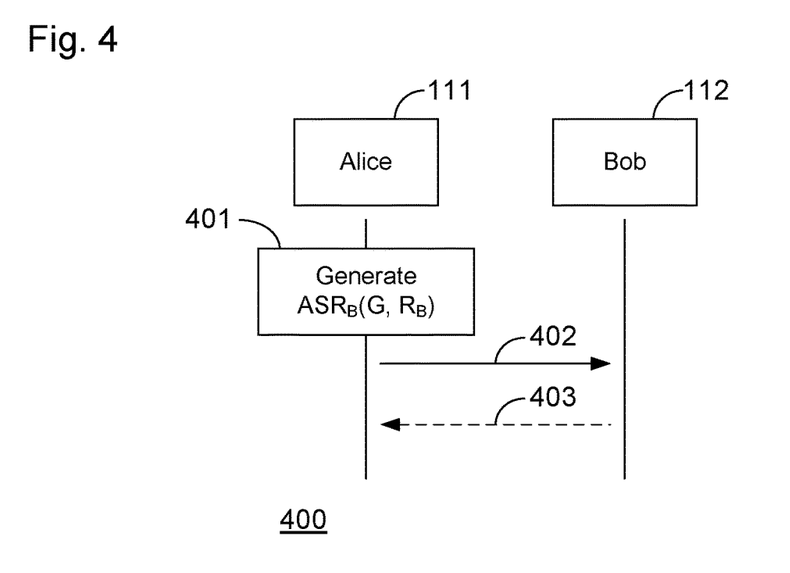
FIG. 4 illustrates another procedure of joining an existing group of network nodes, in accordance with an embodiment of the invention.

With reference to FIG. 4, Alice 111 generates 401 a new assertion $ASR_B(G, R_B)$ for Bob 112, proving that Bob 112 is now a member of group G with role $R_B$. The assertion comprises, among other parameters, the group identity $ID_G$ as well as a one-way hash of $Cert_B$ and $R_B$. It further comprises the identity certificate $Cert_A$ and the assertion $ASR_A(G, R_A)$ of Alice 111. $ASR_B(G, R_B)$ is signed using the private key of Alice 111 and it can therefore be verified by any other member of group G which is assumed to be in possession of the public key of the trusted entity.

Subsequently, the assertion $ASR_B(G, R_B)$ is sent 402 to Bob together with the secret group key $K_G$. The assertion and the group key are encrypted using the public key of Bob 112 such that no third party may gain access to the clear text of the assertion or the group key. Optionally, Bob may acknowledge 403 the reception.

Figure 5:
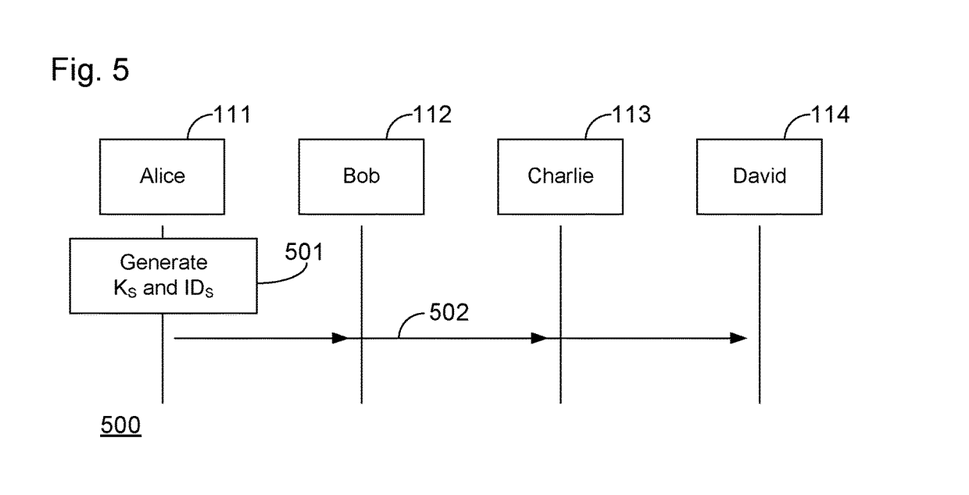
FIG. 5 illustrates a procedure for creating and announcing a new session for a group of network nodes, in accordance with an embodiment of the invention.

The next phase relates to session creation. To this end, a user 111-114 who is member of an existing group G starts a secret session for members of the group. For the present example, it is assumed that all users 111-114 are members of group G. An embodiment of method 500 of creating and announcing a new session is illustrated in FIG. 5.

First, the user who initiates the session, in this case Alice 111, generates 501 a secret session key $K_S$ and selects a suitable session identifier $ID_S$. Optionally, Alice 111 may create a user friendly session name. Then, Alice 111 broadcasts 502 the new session to its group members 112-114. The broadcast message comprises, among other parameters, $K_S$ and $ID_S$, and, optionally, a user friendly session name. The broadcast message is encrypted and authenticated using the group key $K_G$ or a key generated from $K_G$.

Figure 6:
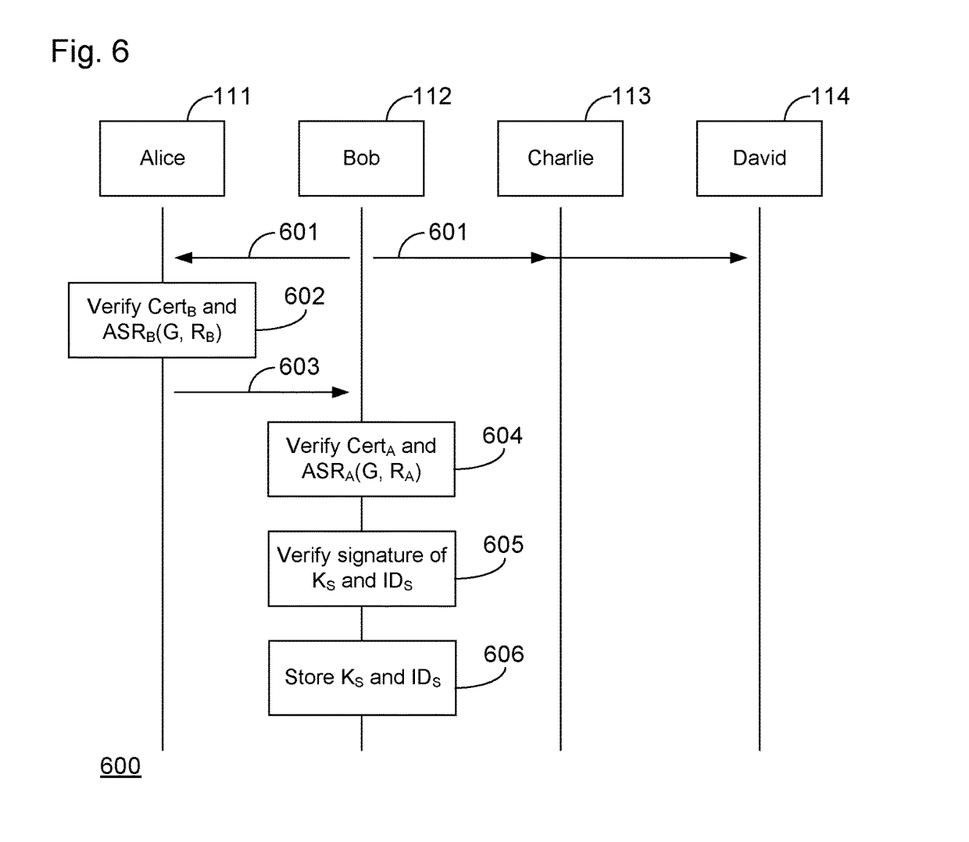
FIG. 6 illustrates a procedure for joining an existing session, in accordance with an embodiment of the invention.

Finally, with reference to FIG. 6, an embodiment of method 600 of a member 111-114 of group G securely joining an existing session, e.g., session S, is described.

First, the user who wants to join the session, in this case Bob 112, starts by broadcasting 601 a session discovery message. The session discovery message comprises, among other parameters, Bob's identity certificate $Cert_B$, Bob's assertion $ASR_B(G, R_B)$, and the session identifier $ID_S$. The session discovery message is encrypted and authenticated using the group key $K_G$ or a key generated from $K_G$. It is important that each discovery message is encrypted using a different initialization vector (IV) in order to prevent an adversary from correlating different discovery messages originating from the same user. The IVs may be generated at random and then appended to the discovery message after it has been encrypted. If message space is limited, another option is to use the current time or a sequence number to generate the IV. Further, if the user is not aware of an existing session, the session identifier IDS may be replaced by a value indicating the Bob is looking for any existing session.

Any user 111, 113, or 114, who is a member of group G and who is within reach of the broadcasted 601 session discovery message, e.g., Alice 111, receives the discovery message and tries to decrypt it using any of its available group keys.

If Alice 111 succeeds with decrypting the session discovery message, and has already joined the request session $ID_S$, Alice subsequently checks 602 whether the received identity certificate and assertion are valid for group G.

Under the condition that Alice 111 has successfully verified 602 Bob's identity certificate and assertion, Alice 111 responds by transmitting 603 a message comprising the session key $K_S$, the session identifier $ID_S$, a public key signature of $K_S$ and $ID_S$, $Cert_A$, and $ASR_A(G, R_A)$, to Bob 112. The public key signature of $K_S$ and $ID_S$ uses a private key corresponding to the public key embedded in $Cert_A$. As a final step before the message is transmitted, Alice encrypts the message using the public key embedded in $Cert_B$.

Bob 112 receives the response transmitted 603 by Alice 111 and tries to decrypt it using its private key. Then, Bob 112 checks 604 the received identity certificate $Cert_A$ and assertion $ARS_A(G, R_A)$ to verify that Alice 111 is a non-revoked member of group G and has the right to participate and distribute session keys in the group.

If the check 604 is successful, Bob 112 verifies 605 the signature of $K_S$ and $ID_S$ using the public key embedded in $Cert_A$. Given that the latter check 605 is successful, Bob 112 stores 606 $K_S$ and $ID_S$ and may use this information to participate securely in the session.

In the event that Bob 112 received several responses to its session discovery message broadcasted 601 to other members of the group, Bob 112 may pick any valid response and ignore the other received messages.

Figure 7:
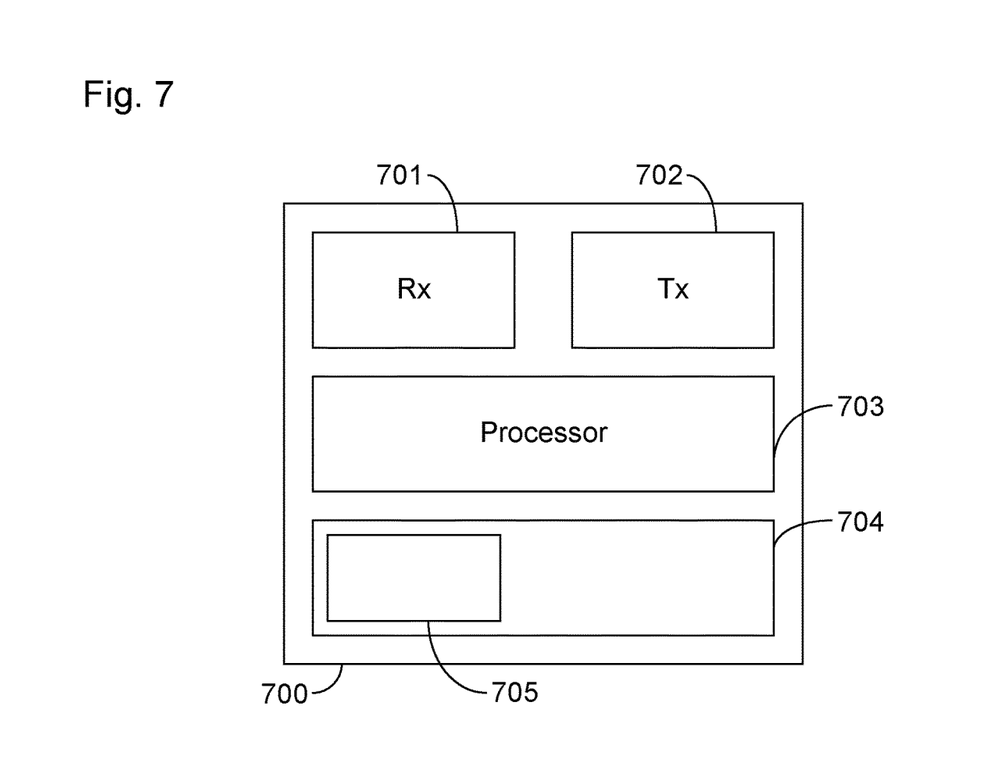
FIG. 7 shows a network node, in accordance with an embodiment of the invention.

In the following, an embodiment of the network node will be described with reference to FIG. 7.

Network node 700 may, e.g., be a mobile phone, a UE, a mobile terminal, a computer, or the like, and comprises a receiver 701, a transmitter 702, and a processor 703. Additionally, network node 700 may comprise a memory 704 for storing software 705 which, when executed on processor 703, induces network node 700 to implement an embodiment of the first or the second aspect of the invention, as described hereinbefore. For this purpose, network node 700 may be provided with an embodiment of the computer program 705 in accordance with the third aspect of the invention. It will be appreciated that the receiver 701, the transmitter 702, and the processor 703, may be considered as functional units which are arranged for collectively performing an embodiment of the first or second aspect of invention. Therefore, the following functional description of units 701-703 should only considered as an example.

Receiver 701 is arranged for receiving an identity certificate for the network node, an assertion for the network node, and a secret group key for the group. These three credentials are typically received from a trusted entity. The assertion certifies a role of network node 700 within a group of network nodes.

In response to a request to create a secure session for members of the group, which request is received by network node 700, processor 703 is arranged for creating a session identifier and a secret session key for the secure session. Further, transmitter 702 is arranged for transmitting a broadcast message comprising the session identifier. The broadcast message is encrypted and authenticated using the group key.

In response to a request to join an existing secure session for members of the group, which request is received by network node 700, transmitter 703 is arranged for sending a discovery message comprising the identity certificate for the network node and the assertion for the network node. The discovery message is encrypted and authenticated using the group key. In addition, receiver 701 is further arranged for receiving a discovery response message from another network node which is a member of the group, and which discovery response message comprises a secret session key for the secure session and is encrypted and authenticated using the public key of the identity certificate of the network node.

Optionally, receiver 701 may further be arranged for receiving a discovery message from a further network node, which discovery message comprises an identity certificate of the further network node and an assertion of the further network node and is encrypted and authenticated using the group key. In addition, processor 703 may further be arranged for determining whether the further network node is on a revocation list provided by the trusted entity, and for determining whether the assertion of the further network node is valid. Even further, transmitter 702 may be arranged for sending, under the condition that the further network node is not on the revocation list and that the assertion of the further network node is valid, a discovery response message to the further network node, which discovery response message comprises the secret session key and is encrypted and authenticated using the public key of the identity certificate of the further network node.

Receiver 701 and transmitter 702 may operate in accordance with any suitable communication technology and protocol, e.g., a radio based communication technology such as Global System for Mobile Communications (GSM), Universal Mobile Telecommunications System (UMTS), Long Term Evolution (LTE), WiFi, Near Filed Communications (NFC), a wired network connection, or the like.

The person skilled in the art realizes that the present invention by no means is limited to the embodiments described above. On the contrary, many modifications and variations are possible within the scope of the appended claims.

The invention claimed is:

1. A method of a network node, for creating a secure session for members of a group of network nodes, the method comprising:
  receiving, from a trusted entity over a channel established based on an identity certificate of the trusted entity:
    an identity certificate for the network node,
    an assertion for the network node, certifying a role of the network node within the group, and
    a secret group key for the group;
  creating a session identifier and a secret session key for the secure session;
  sending a broadcast message comprising the session identifier, which broadcast message is encrypted and authenticated using the group key;
  receiving a discovery message from a further network node of the group of network nodes; and sending a discovery response message comprising the secret session key to the further network node in an event the further network node is not on a revocation list provided by the trusted entity.

2. The method according to claim 1, wherein
the discovery message comprises an identity certificate of the further network node and an assertion of the further network node being encrypted and authenticated using the group key, the method further comprising:
determining whether the assertion of the further network node is valid, and
under the condition that the further network node is not on the revocation list and that the assertion of the further network node is valid, sending the discovery response message to the further network node, wherein the discovery response message is encrypted and authenticated using a public key of the identity certificate of the further network node.

3. The method according to claim 1, wherein the identity certificate is unique for each network node and comprises a public key and a corresponding private key.

4. The method according to claim 1, wherein the assertion is unique for each network node and certifies that the network node is a member of the group and the role of the network node within the group.

5. The method according to claim 1, wherein the group key is unique for each group of network nodes and is symmetric.

6. The method according to claim 1, wherein the identity certificate is received from the trusted entity during a registration phase.

7. The method according to claim 1, wherein the group key and the assertion are received from the trusted entity during a group creation or a group join phase.

8. The method according to claim 1, wherein the group key and the assertion are received from an authorized member of the group during a group creation or a group join phase.

9. A non-transitory computer readable storage medium, having stored thereon, computer-executable instructions that when executed by a computing device, cause the computing device to perform the method according to claim 1.

10. A computer program product comprising a non-transitory computer readable storage medium, the computer readable storage medium having the computer-executable instructions according to claim 9 embodied therein.

11. A method of a network node, for joining a secure session for members of a group of network nodes, the method comprising:
receiving, from a trusted entity over a channel established based on an identity certificate of the trusted entity:
an identity certificate for the network node,
an assertion for the network node, certifying a role of the network node within the group, and
a secret group key for the group;
sending a discovery message comprising the identity certificate for the network node and the assertion for the network node, which discovery messages is encrypted and authenticated using the group key; and
receiving a discovery response message from another network node which is a member of the group in an event the network node is not on a revocation list provided by the trusted entity, and which discovery response message comprises a secret session key for the secure session and is encrypted and authenticated using a public key of the identity certificate of the network node.

12. The method according to claim 11, wherein the discovery message further comprises a session identifier and the secret session key comprised in the discovery response message corresponds to the session identifier.

13. A network node comprising:
a receiver being arranged for receiving, from a trusted entity over a channel established based on an identity certificate of the trusted entity:
an identity certificate for the network node,
an assertion for the network node, certifying a role of the network node within a group of network nodes, and
a secret group key for the group;
a processor; and
a transmitter,
wherein, in response to a request to create a secure session for members of the group:
the processor is arranged for creating a session identifier and a secret session key for the secure session, and
the transmitter is arranged for sending a broadcast message comprising the session identifier, which broadcast message is encrypted and authenticated using the group key, and wherein, in response to a request to join an existing secure session for members of the group:
the transmitter is arranged for sending a discovery message comprising the identity certificate for the network node and the assertion for the network node, which discovery message is encrypted and authenticated using the group key, and
the receiver is further arranged for receiving a discovery response message from another network node which is a member of the group in an event the network node is not on a revocation list provided by the trusted entity, and which discovery response message comprises a secret session key for the secure session and is encrypted and authenticated using the public key of the identity certificate of the network node.

14. The network node according to claim 13, wherein:
the receiver is further arranged for receiving another discovery message from a further network node, which another discovery message comprises an identity certificate of the further network node and an assertion of the further network node and is encrypted and authenticated using the group key, and
the processor is further arranged for:
determining whether the further network node is on a revocation list provided by the trusted entity, and
determining whether the assertion of the further network node is valid, and wherein the transmitter is further arranged for sending, under the condition that the further network node is not on the revocation list and that the assertion of the further network node is valid, another discovery response message to the further network node, which another discovery response message comprises the secret session key and is encrypted and authenticated using the public key of the identity certificate of the further network node.

15. The network node according to claim 13, wherein the discovery message further comprises a session identifier and the secret session key comprised in the discovery response message corresponds to the session identifier.

16. The network node according to claim 13, wherein the identity certificate is unique for each network node and comprises a public key and a corresponding private key.

17. The network node according to claim 13, wherein the assertion is unique for each network node and certifies that the network node is a member of the group and the role of the network node within the group.

18. The network node according to claim 13, wherein the group key is unique for each group of network nodes and is symmetric.

19. The network node according to claim 13, wherein the receiver is further arranged for receiving the identity certificate from the trusted entity during a registration phase.

20. The network node according to claim 13, wherein the receiver is further arranged for receiving the group key and the assertion from the trusted entity during a group creation or a group join phase.

21. The network node according to claim 13, wherein the receiver is further arranged for receiving the group key and the assertion from an authorized member of the group during a group creation or a group join phase.

* * * * *